March 6, 1934.    H. L. MILLER    1,950,256
CONTROL SYSTEM
Filed July 15, 1933    2 Sheets-Sheet 1
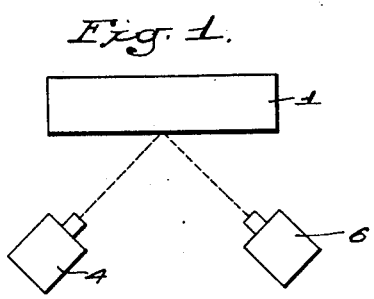
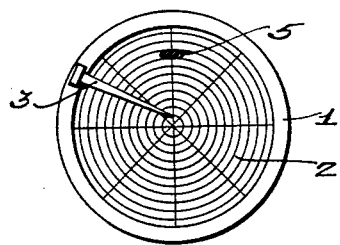
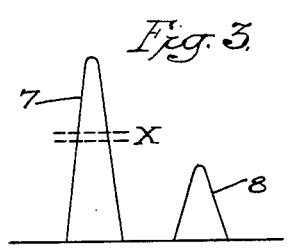
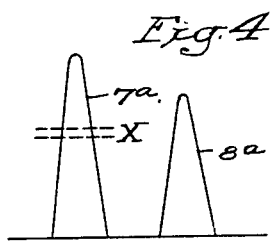
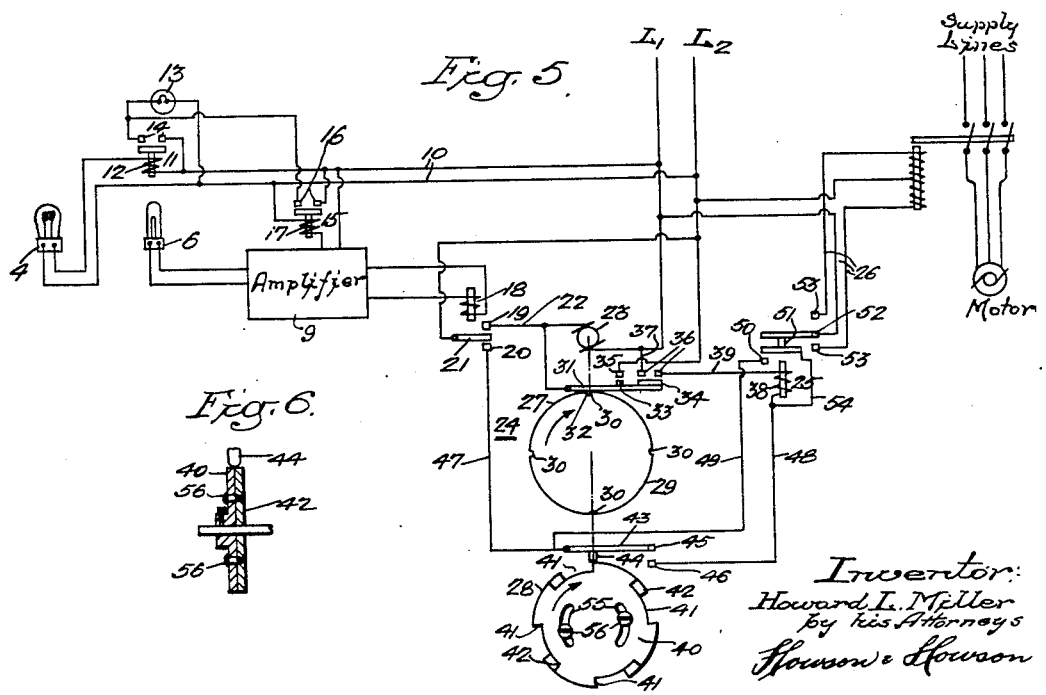
Inventor:
Howard L. Miller
by his Attorneys
Howson & Howson

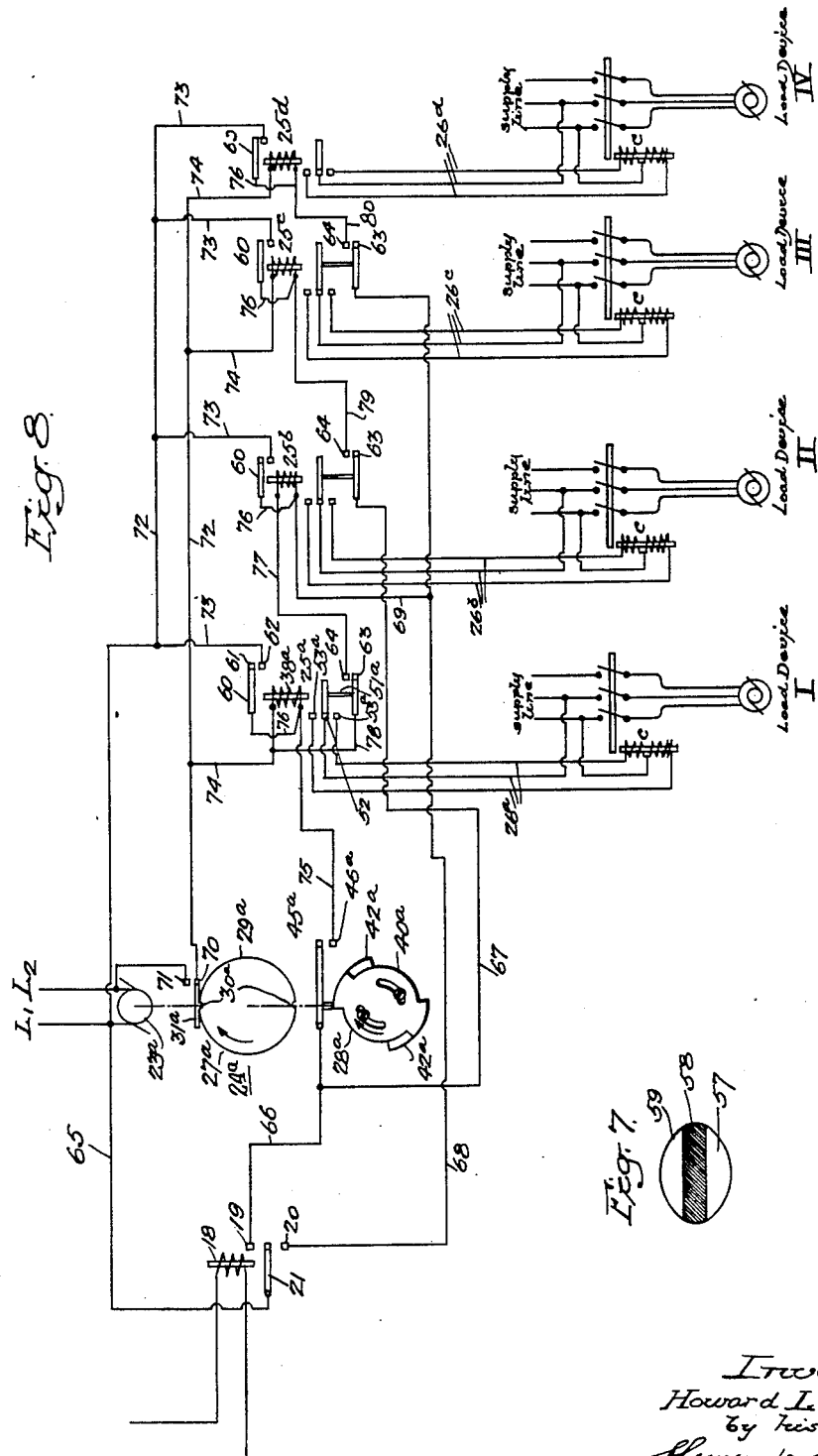

Patented Mar. 6, 1934

1,950,256

UNITED STATES PATENT OFFICE 1,950,256

CONTROL SYSTEM

Howard L. Miller, Philadelphia, Pa.

Application July 15, 1933, Serial No. 680,648

16 Claims. (Cl. 171—97)

REISSUED

This invention relates to control systems and, more particularly, to control systems for limiting the maximum demand of energy-consuming systems, such as utilize electricity, steam, or other forms of energy.

It is customary for energy supplying companies, such as electric power companies, to supply energy to large consumers under a contract which is based upon a minimum and maximum demand over a certain period of time. It is to the consumers' advantage to maintain his load within the stated maximum demand, since if he exceeds that demand, he is penalized under the contract for the entire period thereof. The general purpose of the present invention is to provide a control system by means of which the demand of a consumer may be regulated either automatically or manually, particularly to prevent exceeding the maximum demand stated in the contract or otherwise agreed upon.

An object of the invention is to provide a simple and efficient system which is adapted to limit the demand in any demand period to a predetermined value or to give a signal to an operator when the predetermined value is about to be exceeded so that the operator may take steps to limit the demand as desired.

Another object of the invention is to provide a system of this nature which may be used in conjunction with any conventional meter having a moving element, this system of control having no mechanical or electrical connection to the meter. The system is thus unobjectionable from the viewpoint of the companies supplying the energy, which companies generally object to any device requiring attachment or connection to a part of their equipment.

A further object of the invention is to provide a device of this nature which embodies control by a beam of light arranged in the path of a reflecting portion of a moving element of the meter, the control being effected by light reflected when the said portion of the meter element intercepts or traverses the light beam.

Another object of the invention is to provide a system of the stated character which fully responds only if the meter element traverses a predetermined area of the meter face at a predetermined rate or within a predetermined time interval, which is a function of the energy demand during the particular demand period. This is accomplished by means of a novel timing device forming a part of the invention.

Other objects and features of the invention will more clearly appear hereinafter.

In the drawings:

Fig. 1 is a diagrammatic plan view, showing the relative positioning of the demand meter, a light source, and a light-responsive device, which elements form an essential part of the system;

Fig. 2 is a face view of the meter showing clearly the area in the path of the reflecting portion of the meter stylus defined by the beam of light;

Figs. 3 and 4 are diagrammatic charts, illustrating demand curves enabling a clearer understanding of the operation of the system;

Fig. 5 is a schematic diagram of the electrical circuits of one embodiment of the invention;

Fig. 6 is a detail view of certain elements;

Fig. 7 is a view showing a light-defined sectoral area used in a modified form of the invention; and Fig. 8 is a schematic diagram of the electrical circuits of the modification.

Referring to Figs. 1 and 2, a demand meter is shown at 1 and while the invention is capable of use with any suitable meter, it will generally be used with the conventional graphic demand meter comprising a charted rotatable face 2 and a pivoted stylus 3 adapted to continuously record the load or demand over a certain period of time. A source of light 4 is arranged to project a light beam onto the face of meter 1, the arrangement being such that the light beam defines a predetermined area of the meter face in the path of a reflecting portion of the meter stylus, as shown at 5 in Fig. 2. The stylus of the ordinary demand meter has a reflecting surface which will serve the purpose of the invention. In the event, however, that the meter stylus in any case happens to be substantially non-reflecting, a portion of the stylus may be made to serve the purpose of the invention in any suitable manner, such as by coating that portion with a reflecting substance, or otherwise.

A light-sensitive or light-responsive device 6 is arranged as illustrated in Fig. 1 to receive the reflected beam of light whenever the reflecting portion of the meter stylus intercepts or traverses the beam. At other times, due to the fact that the face of the meter is substantially non-reflecting, there will be substantially no light incident upon device 6 and this device will, therefore, be ineffective at such times. As will be described more in detail hereinafter, device 6 is utilized in conjunction with other suitable apparatus to effect the desired control function. The primary purpose of device 6 is to generate electrical impulses whenever the reflected light beam falls thereon and to supply the generated impulses to control mechanism. Device 6 may, therefore, take the form of any conventional light-sensitive device that is adapted to perform this function. It may, for example, be a photo-electric cell.

In Fig. 3, there are illustrated two demand curves representing successive paths of the stylus pointer during successive demand intervals. Curve 7 is a maximum demand curve representing movement of the stylus pointer in response to the maximum load or demand which it is desired that the energy-consuming system shall not exceed, while curve 8 represents the movement of the stylus pointer in response to a lesser load or demand that may for the present be considered an average demand. It will be noted that curve 7 is substantially greater in magnitude than curve 8 and if the difference in magnitude between a maximum demand curve and an average demand curve were always as great as illustrated, the control contemplated by the invention would be relatively simple. It would be merely necessary to arrange the beam of light so as to define an area on the face of the meter substantially as indicated at $x$ in Fig. 3, this defined area being just beyond the peak or maximum point of the average demand curve so that the control action would only come into play when the meter stylus happened to respond to a maximum load or demand. In such case, there would be no possibility of the control mechanism functioning on an average demand, which, of course, is not desired. Moreover, the time represented by the difference in magnitude of curves 7 and 8 would be amply sufficient to effect the control action in response to a traversal of the area at $x$ by the meter stylus. It would be merely necessary then to have the light-responsive device 6 arranged to actuate the control mechanism whenever this device became energized by the reflected light beam.

While the invention contemplates this simple control wherever it happens to be usable, unfortunately this is very rarely the case. The relation between a maximum demand curve and an average demand curve in most energy-consuming systems is often such as depicted in Fig. 4, wherein curve 7a represents the maximum demand curve and curve 8a represents the average demand curve. Due to the relatively small difference in magnitude between these curves and the small interval of time represented by this difference, it is impossible to effect the control action in the simple manner above described. It is necessary in order to obtain proper control action that the position $x$ of the light beam be substantially as illustrated, this position corresponding generally to the position of Fig. 3 similarly designated. Such positioning of the light beam, as above noted, enables proper functioning of the control mechanism, but owing to the fact that the light-defined area is now below the peak or maximum point of the average demand curve, it becomes necessary to take some precautionary measure to prevent control action on average load or demand or on any demand less than the predetermined maximum. In other words, there must be provided some means to differentiate between the traversal of the light-defined area by the stylus on its way to a maximum indicating position and traversal of the stylus on its way to any demand indicating position less than maximum.

This differentiation may be accomplished in any suitable manner, but I prefer to accomplish it by taking advantage of the relative difference in the rates of travel of the meter stylus on two curves such as are illustrated in Fig. 4. In other words, when the meter stylus is traveling along the maximum demand curve illustrated in Fig. 4, it traverses any area $x$ at a certain speed or rate of travel, which will be in excess of the speed or rate of travel of the stylus when traversing the defined area on a curve such as the average demand curve illustrated.

In Fig. 5, there is illustrated diagrammatically a system which is adapted to function in the manner above described. The light-responsive device 6 is connected to suitable amplifying equipment 9, this equipment preferably comprising one or more thermionic amplifiers of the common vacuum tube type. Light-responsive equipment comprising a light-sensitive cell and one or more amplifiers connected thereto has been used quite frequently heretofore in various instances and it is, therefore, deemed unnecessary to disclose in detail these conventional elements which may be used. The energy supply for the amplifier equipment, as well as for the light source 4 may be derived from lines $L_1$ and $L_2$, which lines may also feed the control mechanism hereinafter described. Lines $L_1$ and $L_2$ may be connected to any suitable source of energy, such as the commonly employed 110 volt, commercial line. In the case of an electrical energy consuming system, lines $L_1$ and $L_2$ may be connected directly to the system. The lamp 4 may be connected directly across the line in the branch circuit 10. I prefer to include in this circuit a no-load relay 11, the energizing winding 12 of which will be connected serially with the lamp. This relay may control any suitable indicating device, such as a lamp 13. It will be seen that lamp 13 is connected across the branch circuit 10 through the stationary contacts 14 of relay 11. Normally, with normal load or current flowing to the lamp 4, relay 11 will be energized, as shown, and lamp 13 will be de-energized. If, however, the load should decrease below normal, due for instance to failure of lamp 4, relay 11 will close its contacts to place lamp 13 across the line, thereby giving an indication that the apparatus is inoperative.

The supply energy for the amplifying equipment may also be derived from branch circuit 10 and in this case also, I prefer to have a no-load relay 15 arranged to energize lamp 13 in the event that the amplifying equipment should become defective or inoperative. It will be seen that lamp 13 is also connected across branch circuit 10 through the stationary contacts 16 of relay 15. The winding 17 of this relay is serially connected with the power-supply equipment of the amplifier. It will be understood that all of the necessary supply energy for the amplifying equipment may be derived from lines $L_1$ and $L_2$ through the medium of suitable transforming and rectifying equipment as is well known, particularly in radio receiving systems. It is deemed unnecessary, therefore, to illustrate in detail this conventional equipment.

The output of the amplifying equipment 9 is connected to a sensitive relay 18, which is adapted to respond to the amplified minute currents generated by the light-responsive device 6. Relay 18 is a double acting relay, being provided with spaced contacts 19 and 20, which are adapted to be selectively engaged by the movable armature 21 of the relay. When the relay is energized, the armature engages contact 19, while when it is de-energized, the armature drops into engagement with contact 20. The armature is connected to line L₂. Contact 19 is connected via conductor 22 to one terminal of a small synchronous motor 23. The other terminal of the motor is connected directly to line L₁. Motor 23 forms a part of a timing device, designated generally by numeral 24, which device, in conjunction with relay 18 is adapted to control the energization of relay 25 which, in turn, controls the energization of control circuit 26. Circuit 26 may include a contactor C which functions to disconnect one or more energy-consuming units or load devices from the system so as to limit the demand. Contactor C may be of conventional type, having opening and closing coils each energized from lines L₁ and L₂. When relay 25 is de-energized, the closing coil of the contactor is energized. When relay 25 is energized, the opening coil of the contactor is energized. Obviously circuit 26 may control any other apparatus, such as a signal lamp or bell, as will be apparent to those skilled in the art, it being understood that the invention contemplates broadly the control of any equipment which is desired to effect a variation in the energy demand or to indicate the necessity for varying the demand.

Considering now the details of timing device 24 and its association with the other elements, this device comprises, in addition to motor 23, a pair of cam-operated switch mechanisms 27 and 28, respectively. The cams of these mechanisms are arranged to be driven by motor 23 at a desired speed. The illustration of the drawings being diagrammatical, this relation of these elements is indicated by the broken lines designating a driving connection between the elements. It will be understood that the cams may be driven by the motor through any suitable mechanism, such as reduction gearing.

The switch mechanism 27 comprises a cam 29 having spaced notches 30 in the peripheral surface thereof and a movable switch arm 31 carrying a cam follower 32 which rides upon the surface of the cam. Switch arm 31 also carries contacts 33 and 34. A stationary contact 35 is arranged for engagement with contact 33, while a pair of stationary contacts 36 are arranged for engagement by contact 34. Contact 35 is connected to line L₂, as clearly illustrated. One of the contacts 36 is connected to line L₁ via conductor 37, while the other contact 36 is connected to one extremity of the energizing winding 38 of relay 25 via conductor 39.

Switch mechanism 28 comprises a cam 40 with spaced recesses 41 in the peripheral surface thereof, a similar adjustable cam 42, and a movable switch arm 43 carrying a cam follower 44 and a contact 45, which is adapted to engage a stationary contact 46. The fixed end of switch arm 43 is connected to contact 20 of relay 18 via conductor 47. Contact 46 is connected to the other extremity of winding 38 via conductor 48. Conductor 49 is connected between conductor 47 and the stationary contact 50 of relay 25. The movable armature 51 of relay 25 comprises spaced insulated contact arms, the upper one of which carries a contact 52 that is adapted to engage stationary contacts 53 to close the circuits of the coils of contactor C. The lower contact arm of armature 51 is connected by conductor 54 to conductor 48 and is adapted to engage contact 50.

It will be noted that the recesses of cams 29 and 40 are uniformly spaced and these cams are arranged in a specific manner with respect to each other. The spacing between successive notches of cam 29 represents a definite demand period, as, for example, a fifteen minute interval. The spacing between successive corresponding points of cam 40, for example between the rear ends of successive lobe portions of the cam, considering the direction of rotation to be as indicated by the arrows, likewise represents the same interval of time. The recesses 41 of cam 40 each represents a definite portion of the said interval of time. When cam follower 32 engages one of the notches 30, cam follower 44 is adjacent the rear end of one of the lobe portions of cam 40, as illustrated. The purpose of adjustable cam 42 is to enable variation of the timing operation of cam 40, as will be more clearly understood from a consideration of the operation of the system. Let us assume that the meter stylus traverses area $x$ on its way to the peak of some curve. The impulse generated by device 6 will be amplified and will energize relay 18, causing armature 21 to engage contact 19. This will close an energizing circuit for motor 23 which may be readily traced. In consequence, the synchronous motor will start to rotate, driving cams 29 and 40. Rotation of cam 29 will cause upward movement of switch arm 31, causing circuit closures at contacts 35 and 36. It will be noted that the closure at contact 35 places a shunt about relay 18, thereby maintaining motor 23 energized for the above-mentioned predetermined period of time regardless of any subsequent operation of relay 18 during that period. The circuit closures at contact 36 connect one extremity of winding 38 to line L₁.

Initial rotation of cam 40 will allow switch arm 43 to drop and the switch arm will remain in lowered position for a portion of the predetermined time period above mentioned, thereby effecting a circuit closure at contacts 45 and 46. If now relay 18 becomes de-energized during the time represented by the recess 41, this will indicate that the traversal of area $x$ by the meter stylus has been at a relatively rapid rate during movement of the stylus along a maximum demand curve. Under such conditions, a circuit closure at contact 20 will complete an energizing circuit for relay 25, thereby energizing this relay to, in turn, energize the opening coil of contactor C. At the end of the predetermined time period, the switch mechanism 27 will function to open the circuit of motor 23 and also that of relay 25, thereby de-energizing the entire control system.

If, however, relay 18 had not become de-energized in a relatively short time, but had remained energized for a longer period of time than that represented by recess 41, such as would be required for the meter stylus to traverse area $x$ on its way to the peak of any curve of lesser amplitude than a maximum demand curve, then the circuit for relay 25 would not be completed since arm 43 would have raised to open contacts 45 and 46. Thus it will be seen that the timing device, in conjunction with relay 18, functions to control the energization of relay 25 in accordance with the rate of travel of the meter stylus during any particular demand interval. It will also be seen that in any operation of the control system, the device resets itself for successive operation.

The purpose of adjustable cam 42 may now be more clearly understood. By virtue of this cam, the time period represented by each of the recesses 41, which controls the energization of relay 25, may be varied as desired to correspond to the time required for the meter stylus to traverse area x on any particular demand curve.

In order that the energization of relay 25 will continue from the time it is effected until the end of the predetermined time period, regardless of the position of switch arm 43 as governed by the adjustable cam 42, relay 25 is arranged to lock itself in by virtue of the shunt about the switch mechanism 28. It will be noted that when relay 25 is energized and the lower contact bar of its armature 51 engages contact 50, the lower extremity of the relay winding is connected via conductors 54 and 49 to conductor 47. Thus relay 25 is placed under complete control of relay 18 during the remainder of the predetermined time interval.

In Fig. 6, cams 40 and 42 are shown side by side in cooperative relation with cam follower 44. The adjustability of cam 42 may be provided by having arcuate slots 55 (see Fig. 5) in cam 40 in which screw pins 56 carried by cam 42 are adapted to ride, the screw pins serving to lock the cams together.

In Figs. 7 and 8, there is illustrated a modified form of the invention which provides for progressive load control by automatic successive control of a plurality of load devices. As will be more clearly apparent hereinafter, the system is adapted to automatically disconnect the several load devices in a regular sequence, departure from this sequence being rendered impossible.

In order to obtain the desired progressive control, the light beam which is projected upon the face of the meter at a predetermined point thereof in the path of the meter stylus is broken up into alternate light and dark portions. This may be accomplished in any suitable manner, for example by passing the light beam through a special lens having alternate translucent and opaque portions, or by simply passing the light beam through a screen which is adapted to break up the beam as desired. Fig. 7 illustrates the area defined by the projected light beam on the meter face. It will be seen that this area comprises a lower light sector 57, a central dark sector 58, and an upper light sector 59. It will be understood that the meter face surrounding the defined area will correspond to the dark portion of the light beam by virtue of the absence of projected light thereon.

In carrying out the desired control action, the time required for the meter stylus to reach the light-defined area is used as a function of the demand during the particular demand period to effect the control action. More specifically, the light beam is arranged so as to define the sectoral area at a predetermined point in the path of travel of the meter stylus, the arrangement being such that the reflecting portion of the meter stylus traverses the sectors of the area successively, traversing sector 57 first, then sector 58, and finally sector 59. The successive sectors are utilized to obtain the progressive control action, as will be more clearly seen hereinafter. As stated above, however, the entire control action is dependent upon the time required for the meter stylus to reach the first sector during its travel in any particular demand interval.

In Fig. 8, the modified portion of the system is illustrated diagrammatically, it being understood that the remainder of the system is substantially identical with that of Fig. 5. In this case, the timing device 24a is modified in certain respects. The driving motor 23a is operated continuously in synchronism with the meter clock or driving device, the motor being directly connected to lines $L_1$ and $L_2$ as illustrated. It will be understood that the synchronous relation between motor 23a and the meter clock or driving device may be maintained and automatically checked at regular intervals in a conventional manner which need not be explained here. Cams 29a, 40a and 42a are designed similarly to the corresponding cams above discussed, but, for simplicity of illustration, these cams are shown in this instance as having only two working portions instead of four. For the purpose of illustration, we may assume that the space between notches 30a of cam 29a represents a demand period of thirty minutes.

Relays 25a, 25b, 25c, and 25d correspond to relay 25 of the above-discussed system, these relays being arranged to control respectively the load devices I, II, III, and IV. The manner in which the control of the various load devices is effected by the respective relays through the medium of contactors C is substantially the same as in the previously discussed system and will be obvious from inspection.

Relays 25a, 25b, 25c, and 25d are substantially identical, one with another, each comprising an energizing winding and front and back contacts and armatures. Relay 25d, however, lacks a pair of contacts which the other relays have for a reason which will be obvious hereinafter. Considering relay 25a as illustrative of these various relays, this relay comprises an energizing winding 38a, a front armature 60 and a back armature 51a. Armature 60 carries a contact 61 which is adapted to engage a stationary contact 62. The back armature comprises spaced insulated contact arms, one of which carries contact 52a that is adapted to engage stationary contacts 53a to energize circuit 26a. The other arm of armature 51a carries a contact 63 which is adapted to engage a stationary contact 64. The other relays of this group are of similar construction and need not be described specifically.

Armature 21 of relay 18 is in this instance connected to line $L_1$ by conductor 65. Contact 19 of the relay is connected by conductor 66 to the switch arm 43a. Conductor 67 also connects contact 19 to the back armature of relay 25b, as clearly illustrated. Contact 20 of relay 18 is connected by conductor 68 to the back armature of relay 25c. A branch conductor 69 also connects contact 20 to one extremity of the energizing winding of relay 25b.

Switch arm 31a of the cam-operated switch 27a carries a contact 70 which is adapted to engage stationary contact 71. These contacts control the energization of branch circuit 72 which may be energized from lines $L_1$ and $L_2$ as will be apparent. Contact 62 of each of the relays 25a, 25b, 25c, and 25d is connected to one side of the branch circuit by conductor 73.

One extremity of the energizing winding of each of relays 25a, 25c and 25d is connected to the other side of the branch circuit 72 by conductor 74. The other extremity of the energizing winding of relay 25a is connected to contact 46a by conductor 75. In each of the four relays, a conductor 76 connects an extremity of the energizing winding to the front armature 60.

Contact 64 of relay 25a is connected to the other extremity of the energizing winding of relay 25b by conductor 77. The armature arm of relay 25a which carries contact 63 is connected to one side of branch circuit 72 by conductor 78. Contact 64 of relay 25b is connected to an extremity of the energizing winding of relay 25c by conductor 79. A similar connection is established between relay 25c and relay 25d by conductor 80.

Considering now the operation of this system, let us assume that a demand period is just starting and that the cams of the timing device are in the respective positions shown. Initial rotation of the cams at the start of the demand period causes circuit closures at contacts 70 and 71 and at contacts 45a and 46a, since switch arm 31a is immediately actuated upward while switch arm 43a is allowed to drop. The effective recessed portion of cam 40a determines the operation of the system. If the reflecting portion of the meter stylus does not reach the light-defined area on the meter face during the period of time corresponding to the effective recessed portion of cam 40a, no control action is had since switch arm 43a will have been again raised to open contacts 45a and 46a. In other words, if the meter stylus is traversing the meter face at a relatively low rate of speed, such as would be had during movement of the stylus on a demand less than maximum, control action is not desired and is not effected.

Let us assume, however, that the meter stylus reaches the light-defined area on the meter face prior to the opening of contacts 45a and 46a. As the reflecting portion of the meter stylus traverses sector 57 of the light-defined area, the light-responsive device 6 is energized by the reflected light, generating an impulse which is amplified and passed through the energizing winding of relay 18. Energization of relay 18 causes engagement of armature 21 with contact 19. This completes a circuit which may be traced as follows. From line $L_1$ through conductor 65, the closed contacts of relay 18, conductor 66, closed contacts 45a and 46a, conductor 75, winding 38a, conductor 74, and closed contacts 70 and 71 to line $L_2$. Relay 25a is thus energized and actuates both its armatures, closing contacts 61 and 62, and contacts 63 and 64, and also closing the energizing circuit of the opening coil of contactor C. Load device 1 is disconnected from its supply by the contactor C in an obvious manner. Closure of contacts 61 and 62 connects the relay energizing winding directly across the branch circuit 72, thereby serving to lock the relay in and to maintain it energized independently of relay 18 or the cam-actuated switch 28a throughout the demand period. Closure of contacts 63 and 64 connects one extremity of the energizing winding of relay 25b to one side of branch circuit 72, as will be obvious.

As the reflecting portion of the meter stylus moves further, it moves into the dark sector 58 of the light-defined area and relay 18 becomes de-energized, its armature 21 engaging contact 20. This completes a circuit through the energizing winding of relay 25b which may be traced as follows. From line $L_1$ through conductor 65, the closed contacts of relay 18, conductor 68, conductor 69, the energizing winding of relay 25b, conductor 77, closed contacts 63 and 64, conductor 78, conductor 74, and closed contacts 70 and 71 to line $L_2$. Relay 25b locks itself in by closure of its front contacts, the same as did relay 25a. Closure of its back contacts causes disconnection of load device 11 from its supply and also connects one extremity of the energizing winding of relay 25c to contact 19 of relay 18.

As the reflecting portion of the meter stylus intercepts sector 59 of the light-defined area during its continued movement, relay 18 is again energized, its armature again engaging contact 19. At this time, relay 25c is energized through a circuit which may be traced as follows. From line $L_1$ through conductor 65, the closed contacts of relay 18, conductor 66, conductor 67, closed contacts 63 and 64 of relay 25b, conductor 79, the energizing winding of relay 25c, one side of branch circuit 72, and closed contacts 70 and 71 to line $L_2$. Relay 25c locks itself in in the above-described manner. It also functions to disconnect load device III and it connects one extremity of energizing winding of relay 25d to contact 20 of relay 18.

As the reflecting portion of the meter stylus leaves sector 59, it passes out of the light-defined area and passes over the meter face corresponding to a dark area. Relay 18 is again de-energized, its armature engaging contact 20. An energizing circuit for relay 25d is completed as follows. From line $L_1$ through conductor 65, the closed contacts of relay 18, conductor 68, contacts 63 and 64 of relay 25c, conductor 80, the energizing winding of relay 25d, one side of branch circuit 72, and contacts 70 and 71 to line $L_2$. Relay 25d locks itself in and also disconnects load device IV. This completes the progressive control action, the load devices having been successively disconnected from their supply lines.

The various relays remain energized throughout the demand period and at the end of the period, switch arm 31a drops into one of the notches 30a, thereby opening contacts 70 and 71 and de-energizing all of the relays 25a, 25b, 25c, and 25d. De-energization of the four relays causes energization of the closing coils and de-energization of the opening coils of contactors C, thereby connecting the load devices to their supply lines. It will be apparent that the system is now reset and is ready for operation in the manner above described, the cams being in the positions shown. It should be noted that the progressive control action can only be had in the manner above described, the operation of relays 25b, 25c and 25d being dependent upon the operation of relay 25a and operation of each relay being specifically dependent upon operation of the preceding relay.

It is important to note that in either of the forms of the invention above described, the control action is dependent upon the rate or time of travel of a meter element over a predetermined area of the meter face. In the first-described system, the control is dependent upon the rate or time of travel of the reflecting portion of the meter stylus over the area of the meter face defined by the beam. In the last-described system, the control is dependent upon the rate or time of travel of the reflecting portion of the meter stylus from its initial point of travel in the demand period until it reaches the light-defined area of the meter face. It should be noted, however, that in any case, the control may be made dependent upon the rate or time of travel of the meter stylus over any predetermined area of the meter face. For example, in the first-described system, the rate or time of travel of the meter stylus before it reaches the light-defined area could be made to govern the action by modifying that system as taught in the last-described system. The latter system could be also modified to cause it to depend for initiation of its control action upon the rate or time of travel of the meter stylus over the first sector of the light-defined area. The invention contemplates broadly the control of any device or devices in accordance with the rate or time of travel of a meter element over any predetermined area or successive areas of the meter face.

It will be seen then that, although certain specific systems have been illustrated and described herein for the purpose of disclosure, various changes and modifications are possible without departing from the spirit and scope of the invention.

The expressions "means for effecting a desired function" and "function-effecting means" are intended to cover only such means as may be used to vary the energy demand of the system or to indicate the necessity for doing so. In the absence of a more appropriate generic term covering both automatic control and automatic signaling of the necessity for control, I have used the said expressions. Such expressions are not intended to unduly broaden the scope of the invention but are to be interpreted to include only such equivalents as I am properly entitled to.

I claim:

1. In an energy consuming system having a meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, and means controlled by said light-responsive means for effecting a desired function.

2. In an energy consuming system having a meter with a movable element which traverses the face of the meter, a demand controlled device free of mechanical connection with said meter, comprising a source of light arranged to project a light beam onto the face of said meter at a predetermined point in the path of a reflecting portion of said element, light-responsive means arranged to receive the reflected light when said portion intercepts said beam, and means controlled by said light-responsive means for effecting a desired function only when said portion intercepts said beam during movement of said element at a rate in excess of a predetermined rate.

3. In an energy consuming system having a meter with a movable element, a demand controlled device free of mechanical connection with said meter, comprising means for defining a predetermined area in the path of said element, means for effecting a desired function, and means responsive to the time of travel of said element over said area for controlling said function-effecting means.

4. In an energy consuming system having a meter with a movable element which traverses the face of the meter, a demand controlled device free of mechanical connection with said meter, comprising means for defining a predetermined area of the face of said meter in the path of said element, means for effecting a desired function, and means responsive to the rate of travel of said element over said area for controlling said function-effecting means.

5. In an energy consuming system having a meter with a movable element, a demand controlled device free of mechanical connection with said meter, comprising a source of light arranged to project a light beam over a predetermined area in the path of a reflecting portion of said element, means for effecting a desired function, and light-responsive means for controlling said function-effecting means in accordance with the time of travel of said element over said area.

6. In an energy consuming system having a meter with a movable element which traverses the face of the meter, a demand controlled device free of mechanical connection with said meter, comprising a source of light arranged to project a light beam onto the face of said meter over a predetermined area in the path of a reflecting portion of said element, means for effecting a desired function, and light-responsive means for controlling said function-effecting means in accordance with the rate of travel of said element over said area.

7. In an energy consuming system having a demand meter with a movable element which traverses the face of the meter, a demand controlled device free of mechanical connection with said meter, comprising a source of light arranged to project a light beam onto the face of said meter at a predetermined point in the path of a reflecting portion of said element, light-responsive means arranged to receive the reflected light when said portion intercepts said beam, means for effecting a desired function, and means controlled by said light-responsive means for controlling said function-effecting means.

8. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a timing device for controlling said function-effecting means, and means controlled by said light-responsive means for additionally controlling said function-effecting means.

9. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a timing device for controlling said function-effecting means, and means controlled by said light-responsive means for actuating said timing device and for additionally controlling said function-effecting means.

10. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a relay for controlling said function-effecting means, an electrically-operable timing device for controlling the energization of said relay, and means controlled by said light-responsive means for additionally controlling the energization of said relay.

11. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a relay for controlling said function-effecting means, an electrically-operable timing device for controlling the energization of said relay, and means controlled by said light-responsive means for controlling the energization of said timing device and for additionally controlling the energization of said relay.

12. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a relay for controlling said function-effecting means, an electrically-operable timing device for controlling the energization of said relay, said timing device comprising a plurality of motor driven cams and switches operable thereby, and means controlled by said light-responsive means for controlling the energization of said timing device and for additionally controlling the energization of said relay.

13. In an energy consuming system having a meter with a movable element, a demand controlled device free of mechanical connection with said meter, comprising means for defining successive areas in the path of said element, a plurality of function-effecting means, and means responsive to the travel of said element over said areas for successively controlling said function-effecting means.

14. In an energy consuming system having a meter with a movable element, a demand controlled device free of mechanical connection with said meter, comprising means for projecting a broken beam of light in the path of a reflecting portion of said element to define a sectoral area having alternate light and dark portions, light-responsive means arranged to receive the reflected light when said portion intercepts said beam, and means controlled by said light-responsive means for successively effecting desired functions as said element traverses successive light and dark portions of said area.

15. In an energy consuming system having a meter with a movable element, a demand controlled device free of mechanical connection with said meter, comprising means for defining successive areas in the path of said element, a plurality of function-effecting means, and means responsive to the time of travel of said element over one of said areas for controlling one of said function-effecting means, and means responsive to the travel of said element over the others of said areas for successively controlling the others of said function-effecting means.

16. In an energy consuming system having a demand meter with a movable element, a demand controlled device free of mechanical connection with said meter, comprising a source of light arranged to project a light beam at a predetermined point in the path of a reflecting portion of said element, light-responsive means arranged to receive the reflected light when said portion intercepts said beam, means for effecting a desired function, means including a relay for controlling said function-effecting means, time-controlled means for initially preparing said relay for energization and for maintaining it so prepared during a predetermined period, and means controlled by said light-responsive means for energizing said relay if said portion intercepts said beam during said period.

HOWARD L. MILLER.